United States Patent Office 3,286,600
Patented Nov. 22, 1966

3,286,600
ELECTRONIC ENGINE CONTROLLERS
Peter John Colburn, Pinner, England, assignor to Ultra Electronics Limited, London, England, a corporation of Great Britain
Filed Mar. 26, 1965, Ser. No. 442,971
8 Claims. (Cl. 91—411)

This invention relates to control system for aircraft or other engines.

Engine control systems are known having between the pilot's or like control lever and a throttle or like controlled element an electrical communication channel with which is associated a device responsive to a plurality of engine conditions so as to modify the effect of displacement of said lever. Thus, the said device may override the said lever should the lever be thrown over to a position corresponding to an acceleration temperature or pressure beyond what is safe for the engine or aircraft. Again, it has been appreciated that it might be desirable to duplicate and even triplicate certain of the equipment against the possibility of failure of one. However, to triplicate the communication channel and the device (conveniently referred to as an overriding device) would be very expensive and bulky. The present invention provides a system wherein the advantages of triplex control can be achieved without seriously increasing the bulk of the equipment. By making a system which has its main governor triplexed working on electro-hydraulic actuators, greater reliability can be achieved with similar bulk to the two lane arrangement which has the advantage that if a failure occurs the mode of control does not change. The modifying characteristics are added from a single overriding device as before, with its output displayed equally to the three lanes. If a failure occurs in the over-riding device then its connection is discontinued.

The following description relates to the accompanying drawings showing by way of example only one embodiment of the invention.

In the drawings.

Figure 1:
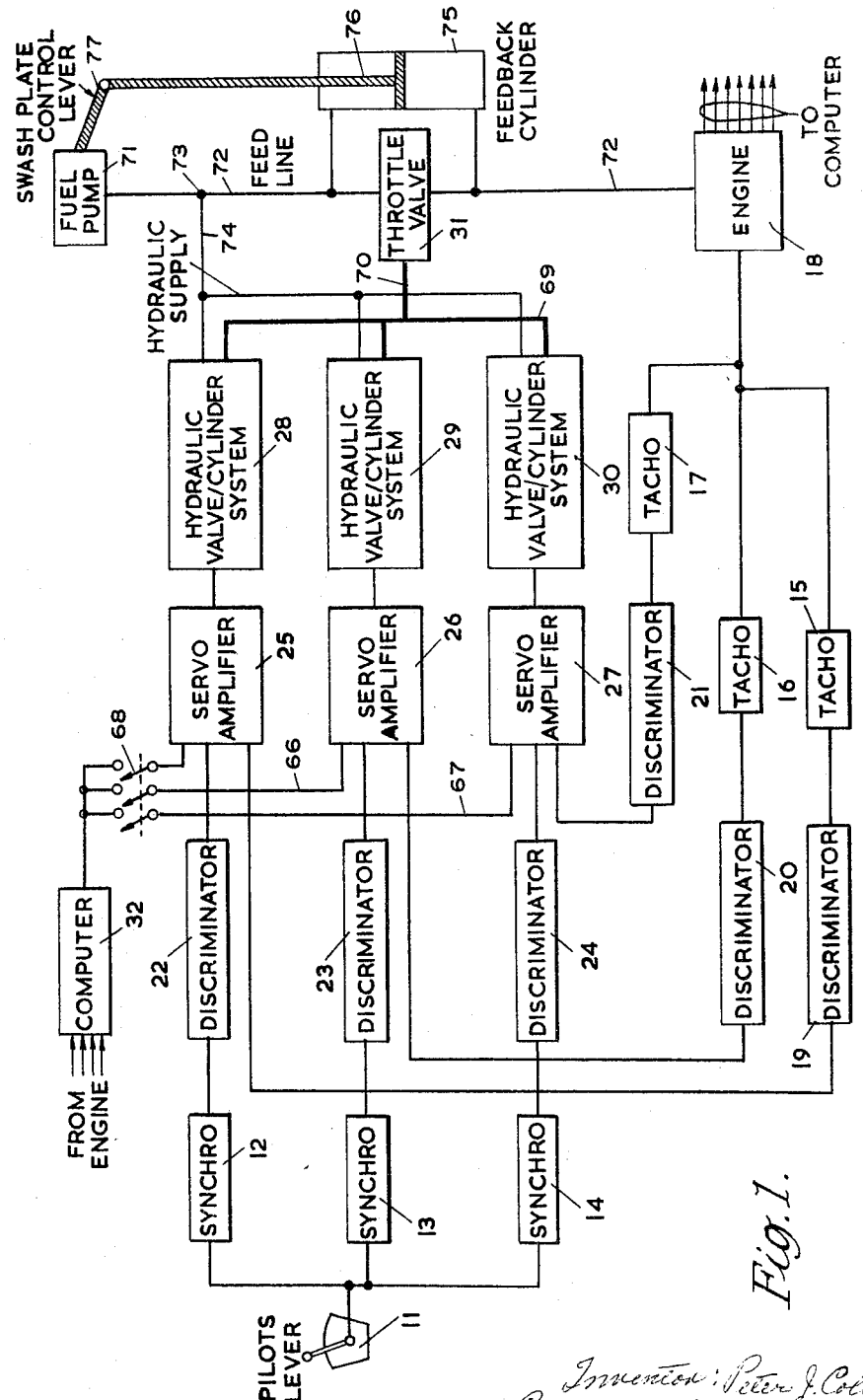
FIGURE 1 is a block schematic of the complete system.

Referring to FIGURE 1, a pilot's lever 11 is mechanically coupled to three linear synchros 12, 13 and 14 where the synchros produce electrical output signals which are directly proportional to the amount of movement of the lever 11. The synchros 12, 13 and 14 are respectively connected to the inputs of discriminators 22, 23 and 24 where the discriminators produce D.C. signals on their outputs, which signals are also proportional to the amount of movement of the lever 11. The output signals of the three synchro devices as converted to D.C. voltages by the discriminators are compared with velocity signals derived from three A.C. tachogenerators 15, 16 and 17, which are coupled to an engine 18. The tachogenerators each produce an output signal, the frequency of which is proportional to the speed of the engine. These signals are sensed and converted to D.C. voltages proportional to the speed of the engine by discriminators 19, 20 and 21 where each of the discriminators is respectively connected to the output of a tachogenerator 15, 16 and 17.

The discriminators 22 and 19 are connected to the input of a servo amplifier 25 and in a like manner the discriminators 23 and 20 are connected to the input of a servo amplifier 26 and the discriminators 24 and 21 are connected to the input of a third servo amplifier 27. The servo amplifiers are of a type well known in the art and are utilized to produce error signals by combining a plurality of inputs to produce a single output. Thus when an engine is operating at a given number of r.p.m.'s and the pilot's lever is advanced or throttled back, the signals on the output of discriminator 22 will be of a different value than the output on discriminator 19 where the output of discriminator 22 calls for a change in engine revolutions per minute. Since discriminators 23 and 24 are paralleled connected at their input to discriminator 22, their outputs will also call for an equal change in engine r.p.m.'s The two signals on the input of each servo amplifier are combined in a manner well known in the art to produce a speed error signal, the polarity of which determines the direction of change in the engine speed.

The engine 18 is also provided with a plurality of sensor devices utilized for sensing hydraulic fluid pressures and engine temperatures as they are related to acceleration. Thus as has been stated, should the pilot's lever 11 be thrown over to a full throttle condition requiring maximum acceleration from the engine, this sort of operation could be detrimental under some circumstances e.g. it could cause the engine to run hot. Engine temperature, as well as fluid pressures and the like may be sensed to provide output signals indicative of the conditions sensed. In the preferred embodiment the sensors are connected to the input of a computer 32 where the computer is used as a pilot override control. The computer 32 is used to provide correctional information to the servo amplifiers 25, 26 and 27. The computer is of a type well known wherein the output signals taken from the engine 18 are compared with stored information. The stored information would of course be information pertaining to acceleration, temperatures and pressures that are within defined safety limits for the operation of the engine. Thus, if the sensed temperatures or pressures differed from the safe values, the computer 32 will produce an error signal output, which signal is coupled to the input of each of the servo amplifiers 25, 26 and 27 over a plurality of lines 65, 66 and 67 respectively. A ganged switch 68 is used for connecting the computer to the respective servos. In normal operation switch 68 is closed.

If temperatures and pressures are normal for the operation of the engine, then the output from the computer 32 is zero and thus the input to the servo amplifiers would be derived from the respective input discriminators. On the other hand, if the condition is one of abnormality, the computer would produce a single output, which output is fed in parallel to the input of each of the servo amplifiers 25, 26, 27. This signal is utilized to modify the command signal generated by the lever 11 to produce an output speed error signal that is safe for the operation of the engine 18. The computer 32 thus constitutes an automatic control for correcting pilot errors in the use of the lever 11 by providing a signal that modifies the pilot's signal.

Each of the servo amplifiers 25, 26 and 27 is connected at its output to the input of a hydraulic valve-cylinder system 28, 29, 30 respectively where the hydraulic systems are used for converting the electrical error signal into a mechanical error signal for operating a throttle valve 31. In general, the three systems operate hydraulic cylinders where the outputs of the individual systems are linked together by a lever 69, to provide a single outlet to a lever 70. The lever 70 is connected to operate a throttle valve 31.

Hydraulic fluid for the systems 28, 29 and 30 is supplied from the engine fuel supply through a fuel pump 71. Fuel from the pump 71 is fed over a feed line 72 to the throttle valve 31, which feed line is tapped, as at 73, to provide fluid to the systems 28, 29, 30 through feed line 74. A feedback cylinder 75 is coupled to both the input and output sides of the throttle valve 31 to provide a signal to operate a piston 76, which signal corresponds to the differential in fluid pressure between input and outlet sides of the throttle valve 31. The piston 76 operates a swash plate control lever 77, which lever controls the operation of the fuel pump 71 in a well-known manner.

Figure 2:
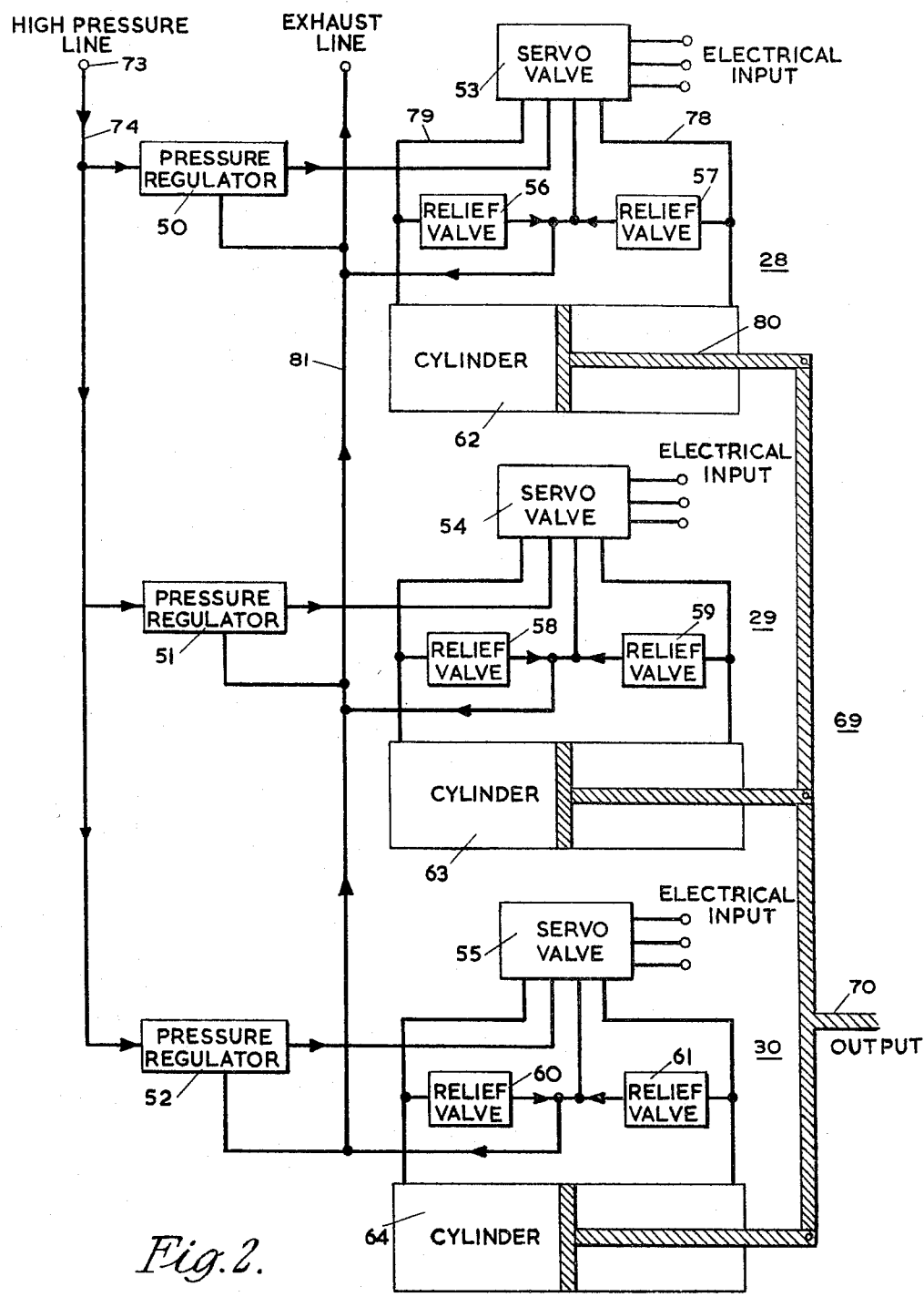
FIGURE 2 is a block schematic of the hydraulic part of the system.

Referring now to FIGURE 2, the hydraulic valve cylinder systems 28, 29 and 30 of FIGURE 1 are shown in a greater detail. The servo amplifiers 25, 26 and 27 are connected at their output ends to the input of servo valves 53, 54 and 55 respectively, where the error signals produced in the servo amplifiers are utilized to control the operation of the respective servo valves. Hydraulic fluid for operating the servo valves is applied over feed lines 74 to a plurality of pressure regulators 50, 51 and 52, which pressure regulators isolate the systems 28, 29 and 30 from each other. The output fluid from each of the regulators is applied to the input of the respective servo valves 53, 54 and 55.

Referring to the hydraulic valve-cylinder system 28, fluid from servo valve 53 is transmitted to a cylinder 62 over a pair of lines 78, 79 for the purpose of operating a piston 80. In a like manner, fluid is supplied to the cylinders 63 and 64 through the servo valves 54 and 55 for operating pistons located within the respective cylinders. All three pistons are connected to the linkage 69 as previously described, which linkage has a common output member 70 connected to control the operation of the throttle valve 31. Thus when fluid is passed by servo valve 53 over line 79 to the left hand side of cylinder 62, the piston 80 will be moved to the right. Under normal conditions, fluid would be passed by servo valves 54 and 55 respectively to the left hand ends of cylinder 63 and 64, thus operating their respective pistons to the right, causing the entire linkage 69 to move to the right and thus the output 70 of the hydraulic valve system is moved to the right. Such movement of course could be utilized for either opening or closing the throttle valve 31.

Relief valves 56 and 57 are provided on either end of the cylinder 62 where the relief valves are of the non-return type. They are utilized for providing fault protection and are set to operate at a predetermined pressure level. The relief valves 56 and 57 are coupled on their outlet end to an exhaust line 81. The hydraulic valve systems 29 and 30 are also provided with relief valves applied to the opposite ends of the cylinders 63 and 64 respectively. Thus for system 29 relief valves 58 and 59 are coupled to both sides of the cylinder 63 and for system 30, relief valves 60 and 61 are coupled on each end of the cylinder 64. The output ends of these relief valves are also connected to the exhaust line 81.

A typical fault condition might constitute the application of fluid to the left hand sides of the cylinders 62 and 64 and fluid to the right hand side of cylinder 63. In such an event, the linkage 69 would move to the right in response to fluid applied to the piston 80 and the piston in cylinder 64. This would cause the piston located in cylinder 63 to also move to the right, thus building up pressure on the right hand side of cylinder 63 until it exceeded the preset amount whereupon relief valve 59 would operate and exhaust fluid from the cylinder 63 into the exhaust line 81. As will be obvious to those skilled in the art, a conventional indicator device could be connected to the relief valves 59 and set to respond when the relief valve is operated. A fault indication could then be displayed to the pilot.

In normal operation signals are applied to the input of the servo amplifiers 25, 26 and 27 from two sources (the pilot and the engine) which signals are utilized to control the operation of the hydraulic valve systems to ultimately control operation of the throttle valve 31. During abnormal operations, where an exemplary abnormal operation might be difined to mean a pilot's call for an acceleration or speed in excess of limits that have been defined as safe for the engine 18, the computer 32 overrides the operation of the lever 11 by providing a signal in opposition to the signals produced at the outputs of the discriminators 22, 23 and 24, which signal is also applied to the input of the servo amplifiers 25, 26 and 27. This signal is used in combination with the two other inputs to control the hydraulic valve-cylinder systems 28, 29 and 30.

I claim:
1. A speed control system for an engine comprising:
   a control lever;
   three parallel connected electrical communication channels having their inputs operatively connected to said lever;
   a throttle operatively connected to the output of said communications channels such that signals on said communications channels control the operation of said throttle; and
   a single control means operatively connected between said engine and the inputs of said communications channels, said control means being responsive to a plurality of engine conditions for modifying the operating effects of said lever on said channels.

2. A speed control system according to claim 1 wherein said single control means comprises:
   sensor means operatively associated with said engine for determining a plurality of engine operating conditions; and
   a computer having its input connected to said sensor means and its output to said communications channels, said computer providing an output signal to modify the effect of said lever on said channels when engine operating conditions exceed predetermined safe limits.

3. A speed control system for an engine comprising:
   a plurality of parallel connected control channels;
   a control lever;
   means connecting said control lever to each of said channels, said means producing separate equal electrical signals in each of said channels;
   speed conversion means operatively conected to said engine and to each of said control channels for converting engine speed into proportional electrical signals and applying said signals to said channels;
   a plurality of sensor devices mounted so as to sense abnormal conditions during engine operation;
   a computer means having its input connected to said sensors and its output connected to said control channels for providing an output signal during abnormal engine operating conditions to modify signals applied to said control channels by said means for connecting said control lever to said channel;
   means in each of said channels for combining the input signals applied to each of said channels to produce a resultant output signal;
   a source of fuel;
   a throttle valve connecting said fuel source to said engine, said throttle valve being operatively connected to said control channels such that signals applied to said control channels control the amount of fuel supplied to said engine.

4. A speed control system according to claim 3 wherein said means for connecting said control lever to each of said control channels comprises:
   three synchro devices connected to said lever, each of said synchro devices producing an electrical analog of the movement of said lever; and
   three electrical discriminators, each of said discriminators being connected to one of said synchro devices for converting said analog into a D.C. signal.

5. A speed control system according to claim 3 wherein said speed conversion means comprises three tachogenerators conected in parallel on one side to said engine; and
   three electrical discriminators, each of said discriminators being connected to one of said tachogenerators.

6. A speed control system according to claim 3 wherein said means for combining signals comprises a servo amplifier in each of said plurality of control channels.

7. A speed control system according to claim 3 wherein each of said control channels comprises:
- an electrical circuit for summing a plurality of control signals to produce a resultant output signal;
- a cylinder;
- a hydraulically operated piston mounted for reciprocating movement in said cylinder; and
- electrically operated valve means connected to said electrically circuit for controllably applying hydraulic fluid to either side of said piston in response to said resultant output signal.

8. A speed control system according to claim 7 wherein said electrically operated valve means comprises:
- a servo valve having at least one inlet port and having at least two outlet ports;
- a source of hydraulic fluid;
- a hydraulic feed line connecting said inlet port to said source;
- a fluid pressure regulator located in said feed line;
- a plurality of outlet feed lines connecting at least two of said outlet ports to said cylinder;
- an exhaust line; and
- a pair of relief valves connected on one end to said exhaust line, each of said relief valves being connected on the other end to one each of said outlet feed lines.

References Cited by the Examiner
UNITED STATES PATENTS

| 3,095,783 | 7/1963 | Flindt | 91—1 |
| 3,095,784 | 7/1963 | Colhoun | 91—1 |
| 3,124,041 | 3/1964 | McMurtry et al. | 91—1 |
| 3,198,082 | 8/1965 | Kerris | 91—1 |

EDGAR W. GEOGHEGAN, *Primary Examiner.*